US009332045B2

(12) United States Patent
Panicker

(10) Patent No.: US 9,332,045 B2
(45) Date of Patent: May 3, 2016

(54) AUTOMATIC INITIATION OF A COLLABORATIVE SESSION

(71) Applicant: Rajesh Panicker, Fremont, CA (US)

(72) Inventor: Rajesh Panicker, Fremont, CA (US)

( * ) Notice: Subject to any disclaimer, the term of this patent is extended or adjusted under 35 U.S.C. 154(b) by 136 days.

(21) Appl. No.: 14/452,526

(22) Filed: Aug. 5, 2014

(65) Prior Publication Data

US 2016/0044070 A1 Feb. 11, 2016

(51) Int. Cl.
G06F 15/16 (2006.01)
H04L 29/06 (2006.01)
H04L 29/08 (2006.01)
G06F 11/14 (2006.01)

(52) U.S. Cl.
CPC .............. *H04L 65/403* (2013.01); *H04L 67/10* (2013.01)

(58) Field of Classification Search
USPC .......................... 709/204, 219, 231, 218, 227
See application file for complete search history.

(56) References Cited

U.S. PATENT DOCUMENTS

| 7,174,433 | B2 * | 2/2007 | Kottomtharayil | ..... G06F 3/0617 709/219 |
| 2006/0164992 | A1 * | 7/2006 | Brown | .................... H04L 12/58 370/235 |
| 2011/0022882 | A1 * | 1/2011 | Jaehde | ................ G06F 11/2023 714/4.1 |
| 2013/0279326 | A1 * | 10/2013 | Dunne | ................ H04L 41/5025 370/228 |
| 2014/0095922 | A1 * | 4/2014 | Baker | ..................... H04L 67/14 714/4.2 |
| 2015/0363286 | A1 * | 12/2015 | Blea | .................... G06F 11/1666 714/6.3 |

* cited by examiner

*Primary Examiner* — Jude Jean Gilles

(74) *Attorney, Agent, or Firm* — Raj Abhyanker, P.C.

(57) ABSTRACT

A method includes a conference facilitation server to determine whether a conference initiator has defined a set of conference parameters, storing the set of conference parameters in a database. The server communicates a conference invitation to each of the proposed participants using contact identifiers and designates the proposed participants as a confirmed participants when the proposed participants send conference acknowledgements to the conference server, responsive to the conference invitation to participate in a collaborative session. The server automatically initiates a first attempt to establish communications with each of the confirmed participants at the conference time on the conference date through a conference medium using contact identifiers. If the first attempt to establish communication fails then the server automatically initiates an additional attempt to establish communications with a particular confirmed participant with whom the first attempt has failed.

20 Claims, 8 Drawing Sheets

| CONFIRMED PARTICIPANT NAME 400 | SET OF CONTACT IDENTIFIERS 208 | FAILOVER - PREFERRED ORDER OF CONTACT IDENTIFIERS: 212 | FAILOVER - USE ALL CONTACT IDENTIFIERS FOR 214 | CLASSIFICATION 216 | SIGNAL STRENGTH 402 | STATUS 404 |
|---|---|---|---|---|---|---|
| John Smith | {(408) 555-2279, (520) 555-1288, facetime:// johnsmith@gmail.com} | {1,3,2} | Additional Attempts | Mandatory | Good | Connected |
| Mike Jones | {skype:// mjones1234, (414)555-2021} | {1,2} | All Attempts | Mandatory | Good | Connected |
| Frank Wilson | {(408) 555 - 9977 (408) 555 -1111 extn. 27} | {1,2} | Lost Signal | Optional | Lost | Reacquiring (Attempt #4) |
| ... | ... | ... | ... | ... | ... | ... |

TABLE VIEW 450

FIGURE 4

AUTOMATIC INITIATION OF A COLLABORATIVE SESSION

FIELD OF TECHNOLOGY

This disclosure relates generally to communication and, more particularly, to automatic initiation of a collaborative session.

BACKGROUND

A collaborative session may involve a group of participants. For example, the group of participants may communicate during the collaborative session through a phone call, a videoconference session, a group chat, a telepresence session, a web conference, a screen share, and/or an online collaborative session. An individual may need to publish a phone number and an access code associated with the collaborative session to the group of participants. The phone number and the access code may be static and not change often. Each of the group of participants may need to remember to join the collaborative session on their own.

A particular member of the group of participants may forget about when to join the collaborative session. Objectives for the collaborative session may not be achieved and time may be wasted because other participants may not benefit from the interaction with the particular member during the collaborative session. In addition, uninvited participants may join the collaborative session without permission if they acquire the phone number and the access code, whether in an unauthorized manner or from participation in a previous session. Sometimes, the particular member may need time to search for the phone number and the access code. Therefore, they may join the collaborative session late. This may be disruptive and cause others to repeat what has already been said. As a result, productivity may suffer and initiating the collaborative session may be a frustrating experience.

SUMMARY

Disclosed are a method, a device and/or a system of automatic initiation of a collaborative session.

In one aspect a method of a conference facilitation server determines, using a processor and a memory, that a conference initiator has defined a set of conference parameters, storing the set of conference parameters in a database. The set of conference parameters includes a conference date, a conference time, a conference medium, and a contact identifier associated with each of a plurality of a proposed participants. The method includes communicating a conference invitation to the proposed participants using the contact identifiers associated with the plurality of proposed participants. The method further includes designating the proposed participants as confirmed participants when the proposed participants send conference acknowledgements to the conference facilitation server responsive to the conference invitation to each of the proposed participants. The confirmed participants are those proposed participants that agree to join a collaborative session. The method processes a collection of participant parameters of the confirmed participants, the collection of participant parameters comprising, for each confirmed participant, a set of contact identifiers and a failover preference.

The method automatically initiates a first attempt to establish communications with the confirmed participants at the conference time on the conference date through the conference medium(s) using the set of contact identifiers associated with each of the confirmed participants. The method also ensures that the first attempt is made in accordance with a failover preference associated with each confirmed participant and simultaneously makes the first attempt to establish communications with a portion of the confirmed participants in parallel. The method determines whether the first attempt to establish communications with at least one confirmed participant has failed and automatically initiates an additional attempt to establish communications with a particular confirmed participant with whom the first attempt has failed, using the set of contact identifiers associated with the particular confirmed participant, in accordance with a particular failover preference associated with the particular confirmed participant. The failover preference associated with the particular confirmed participant may specify at least a preferred order in which the set of at least one contact identifier associated with the particular confirmed participant are to be used in making attempts to establish communications.

The conference medium may be a phone call, a videoconference session, a group chat, a telepresence session, a web conference, a screen share, and/or an online collaborative session. The failover preference associated with each confirmed participant may further specify that a plurality of the contact identifiers may be used simultaneously while making the first attempt, and/or the additional attempt.

The set of conference parameters may further includes a classification of each of the proposed participants as mandatory or optional, where the conference initiator may be an individual, a third-party service provider, a web application, an internet appliance and/or a mobile application. A conference may be cancelled if a conference acknowledgement has not been received by the conference time on the conference date from each of the proposed participants classified as mandatory.

The collaborative session may be terminated if communications are yet to be established with all of the confirmed participants classified as mandatory within a maximum waiting time. The communications with all of the confirmed participants classified as mandatory may be established before attempting to establish communications with remaining confirmed participants. The conference parameters may include an entry time limit, such that attempts to establish communications with confirmed participants cease once the entry time limit has elapsed. The participants may be denied a permission to initiate communications with the conference.

The method may determine that there is an unexpected loss of communications with a poor-signal participant. The method may automatically reestablish communications between the poor-signal participant and a remaining confirmed participant based on the determination that there is the unexpected loss of communications with the poor-signal participant.

The communications between the poor-signal participant and the remaining confirmed participants may automatically reestablished by repeatedly attempting to contact the poor-signal participant using the contact identifiers associated with the poor-signal participant. A repeated attempt to contact the poor-signal participant may be made in accordance with the failover preferences associated with the poor-signal participant.

In another aspect, a method of a conference facilitation server includes processing a set of conference parameters in a database, the set comprising a conference date, a conference time, a conference medium, and a contact identifier of each of a plurality of proposed participants, using a processor and a memory. The method includes storing the set of conference parameters in the database, the set comprising the conference date, the conference time, the conference medium, and/or the contact identifier of each of a plurality of proposed participants. The method sends a conference invitation to each of the proposed participants using contact identifiers. The method further designates the proposed participants as a confirmed participants based on a response of the proposed participants. The confirmed participants are those proposed participants that agree to join a collaborative session in this aspect. The method processes conference acknowledgements from confirmed participants and processes a collection of participant parameters for each of the confirmed participants, the collection of participant parameters comprising, for each confirmed participant, a set of at least one contact identifier, and a failover preference. The method initiates a conference communication at the conference time on the conference date through at least one conference medium by automatically making a first attempt to establish communications with each of the confirmed participants using the set of contact identifiers associated with each of the confirmed participants, in accordance with the failover preference associated with each confirmed participant. The method determines an attempt to establish communications with at least one confirmed participant has failed and makes additional attempts to establish communications with a particular confirmed participant for whom a previous attempt has failed, using the set of contact identifiers associated with the particular confirmed participant, in accordance with the failover preference associated with the particular confirmed participant. The failover preference associated with each confirmed participant further specifies a preferred order in which the contact identifiers are to be used in making attempts to establish communications.

In yet another aspect, a conference facilitation system includes a conference facilitation server, including a processor and a memory configured to process a set of conference parameters. The set of conference parameters comprises a conference date, a conference time, at least one conference medium, and a contact identifier for each of a plurality of proposed participants. The method prepares a conference invitation for each of the proposed participants and processes a conference acknowledgement from one or more confirmed participants. The method processes a collection of participant parameters for each of the confirmed participants. The collection of participant parameters comprises a set of at least one contact identifier and a failover preference, where the failover preferences associated with each confirmed participant specifies a preferred order in which the set of at least one contact identifier is to be used in making attempts to establish communications. The method initiates a collaborative session at the conference time on the conference date by automatically triggering a first attempt to establish communications with each of the confirmed participants using the set of contact identifiers associated with each of the confirmed participants, in accordance with the failover preferences associated with each confirmed participant. The first attempt to establish communications with at least a portion of the confirmed participants is triggered in parallel.

The method triggers an additional attempt to establish communications with a particular confirmed participant for whom a previous attempt has failed, using the set of contact identifiers associated with the particular confirmed participant, in accordance with the failover preferences associated with the particular confirmed participant. The database is communicatively coupled with the conference facilitation server to store the set of conference parameters and the collection of participant parameters for each of the confirmed participants. A communication platform is communicatively coupled with the conference facilitation server to instantiate a collaborative session by attempting to establish communications with at least one confirmed participant through the conference mediums, and to determine whether an attempt to establish communications has failed.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE FIGURES

The embodiments of this disclosure are illustrated by way of example and not limitation in the figures of the accompanying drawings, in which like references indicate similar elements and in which:

FIG. 4 is a table view of the collection of participant parameters described in FIG. 2, along with a signal strength and a status of each confirmed participant name, according to one embodiment.

Other features of the present embodiments will be apparent from accompanying drawings and from the detailed description that follows.

DETAILED DESCRIPTION

In the following description, for the purposes of explanation, numerous specific details are set forth in order to provide a thorough understanding of the various embodiments. It will be evident, however, to one skilled in the art that the various embodiments may be practiced without these specific details.

Figure 1:
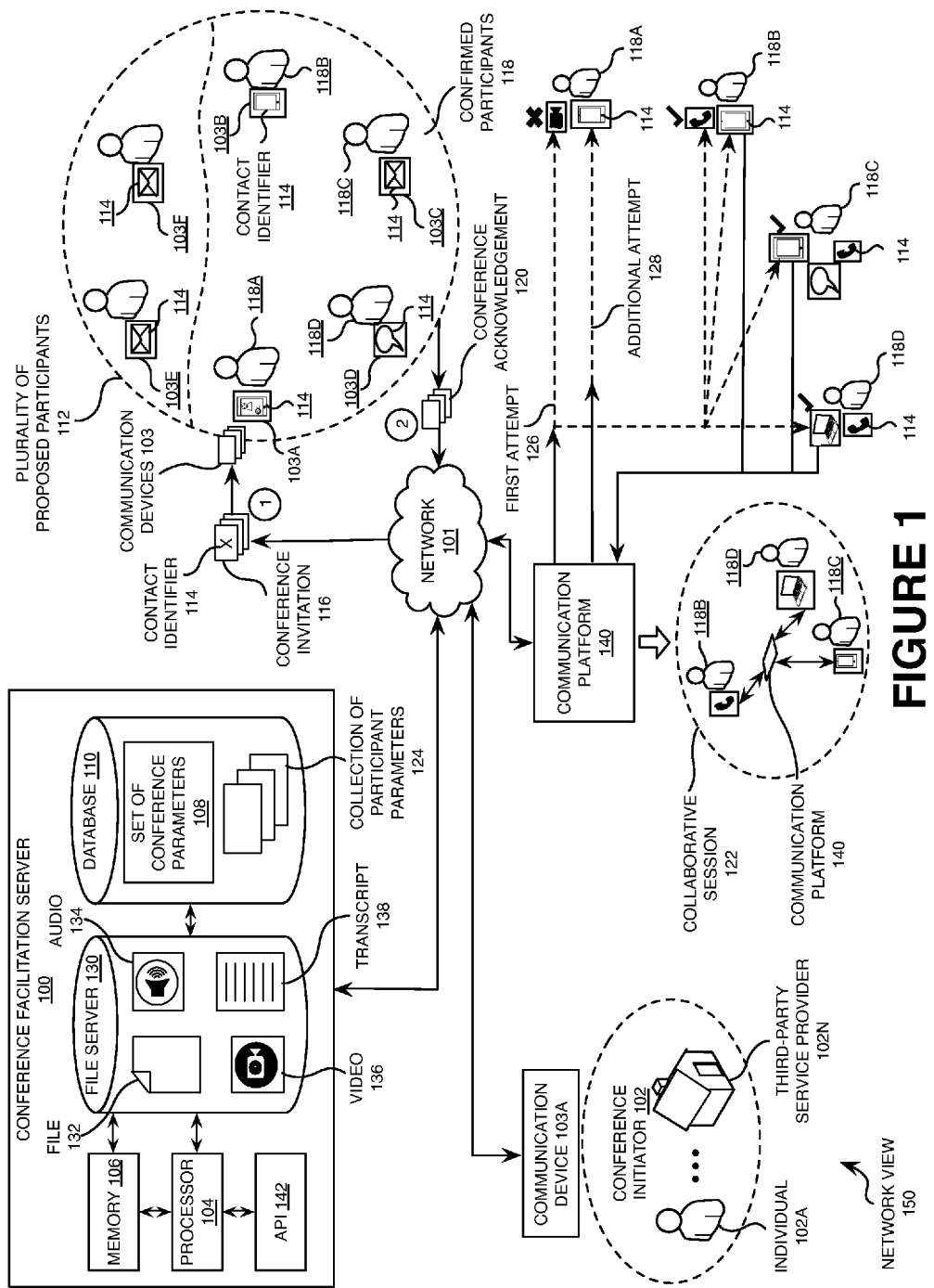
FIG. 1 shows a network view of a conference facilitation server having a database communicating with a conference initiator and a communication platform, according to one embodiment.

FIG. 1 shows a network view 150 of a conference facilitation server 100 having a database 110 communicating with a conference initiator 102 and a communication platform 140, according to one embodiment. Particularly, FIG. 1 shows the conference facilitation server 100, the conference initiator 102 (e.g., an individual 102A, a third-party service provider 102N), a communication devices 103, a processor 104, a memory 106, a set of conference parameters 108, a database 110, a plurality of proposed participants 112, a contact identifier 114, a conference invitation 116, a set of confirmed participants 118, a conference acknowledgement 120, a collaborative session 122, a collection of participant parameters 124, a first attempt 126, an additional attempt 128, a file server 130, a file 132, an audio recording 134, a video recording 136, a transcript 138, a communication platform 140, an API 142.

The conference facilitation server 100 may be may be a computing system (e.g., a laptop, a desktop, a mobile device) and/or computer program that manages access to a centralized resource or service in a network 101. The network 101 may be a telecommunications network that allows computers to exchange data. The conference initiator 102 (e.g., an individual 102A, a third-party service provider 102N) may be a user or entity that takes an initiative (e.g., is resourceful) to make a conference happen. The communication devices 103 may be mobile phones, landline phones, tablet devices and/or desktop computing devices associated with each the conference initiator 102 and/or plurality of proposed participants. The processor 104 may be a central processor unit (CPC) that may carry out the instructions of a computer program by performing the basic arithmetical, logical, and/or input/output operations of a computing system.

The memory 106 may be physical devices used to store programs (sequences of instructions) and/or data (e.g. program state information) on a temporary and/or permanent basis for use in a computer or other digital electronic device. The set of conference parameters 108 may be a special kind of variable associated with a conference that may be used in a subroutine to refer to one of the pieces of data provided as input to the subroutine. The database 110 may be an organized collection of data.

The plurality of proposed participants 112 may be users that are suggested to participate in the collaborative session. The contact identifier 114 may be a sequence of characters (e.g., alphanumeric, numeric, alpha only, etc.) used to identify and/or refer to a program or an element, such as a variable or a set of data, within it, associated with a contact. The contact identifier 114 may also be a representation of an individual or entity within a particular communication medium or system (e.g. email address, user name, IP address, etc.). The conference invitation 116 may be a request inviting participants to a collaborative session. The set of confirmed participants 118 may be participants that have agreed to join a collaborative session. The conference acknowledgement 120 may be an acceptance to join the collaborative session.

The collaborative session 122 may be a semi-permanent interactive information interchange, also known as a dialogue, a conference, a conversation and/or a meeting, between two or more communicating devices, and/or between a computer and user. The collection of participant parameters 124 may be a gathering of parameters associated with a participant. The first attempt 126 may be an initial effort to set up a collaborative session. The additional attempt 128 may be a subsequent effort to set up a collaborative session. The file server 130 may be a computing system that holds a method of managing files and/or folders in the computing system. The file 132 associated with a collaborative session may be a document, a folder, and/or a container having an application or data related to an operation of a computer. The audio recording 134 of a collaborative session may be a sound, such as when recorded, transmitted, and/or reproduced. The video recording 136 of a collaborative session may be a recording, reproduction, and/or broadcast of moving visual images.

The transcript 138 of a collaborative session may be a written and/or printed version of material originally presented in another medium. The communication platform 140 may be a computing platform that obeys constraints and makes use of facilities. The communication platform 140 may also bridge different communication mediums (e.g. bridging a phone call with a video conference, etc.) The API 142 may be an application programming interface (API) which specifies how some software components should interact with each other.

The conference facilitation server 100 is communicatively coupled with the communication device 103A associated with a conference initiator 102, the communication platform 140, a number of additional communication devices 103 (e.g., 103B-103F) associated with each of the plurality of proposed participants 112, through a network 101. The conference facilitation server 100 may include a processor 104 communicatively coupled with a memory 106 and with a storage device (not shown) having an application programming interface 142. The processor 104 and the memory 106 may be communicatively coupled with a file server 130, as illustrated in FIG. 1. The file server 130 may be communicatively coupled with a database 110, as described in FIG. 1. The file server 130 may include a file 132 associated with a collaborative session, a video recording 136 of a collaborative session, a transcript 138 of a collaborative session, and an audio recording 134 of a collaborative session. The database 110 may include a set of conference parameters 108 and a collection of participant parameters 124.

In accordance with one embodiment, at the date and time specified by the conference initiator 102, a first attempt 126 may be made to establish communication between the communication platform 140 and the communication devices 103 associated with each of the plurality of confirmed participants 118, using the contact identifiers 114 associated with each confirmed participant, in accordance with their failover preference 210. Specifically, FIG. 1 illustrates a first attempt 126 to establish communication between the communication platform 140 and the communication devices associated with confirmed participants 118A-D. As shown, the first attempt 126 to establish communication with confirmed participants 118B-D is performed in parallel (in accordance with the set of conference parameters 108), and is successful. Furthermore, the first attempt 126 to establish communication with confirmed participant 118B is made by contacting both communication devices associated with that individual, through contact identifiers 114. The first attempt 126 to establish communication with confirmed participant 118A fails; as a result, an additional attempt 128 may be automatically made to establish communication with a different communication device using a different contact identifier, in accordance with a failover preference 210 associated with confirmed participant 118A.

As shown, upon the successful establishment of communications with confirmed participants 118, a collaborative session 122 is formed. Specifically, FIG. 1 illustrates that collaborative session 122 is formed between the communication platform 140 and confirmed participants 118B-D, through their respective communication devices 103.

FIG. 1 illustrates an operation 'circle 1' and another operation 'circle 2'. First, in 'circle 1', a conference invitation 116 is communicated from the conference facilitation server 100 to each of the communication devices 103 associated with each of the plurality of proposed participants 112 using contact identifiers 114. In response, as described in 'circle 2', a conference acknowledgement is returned from the communication devices 103 associated with each of the plurality of proposed participants 112 that is communicated back to the conference facilitation server 100.

Figure 2:
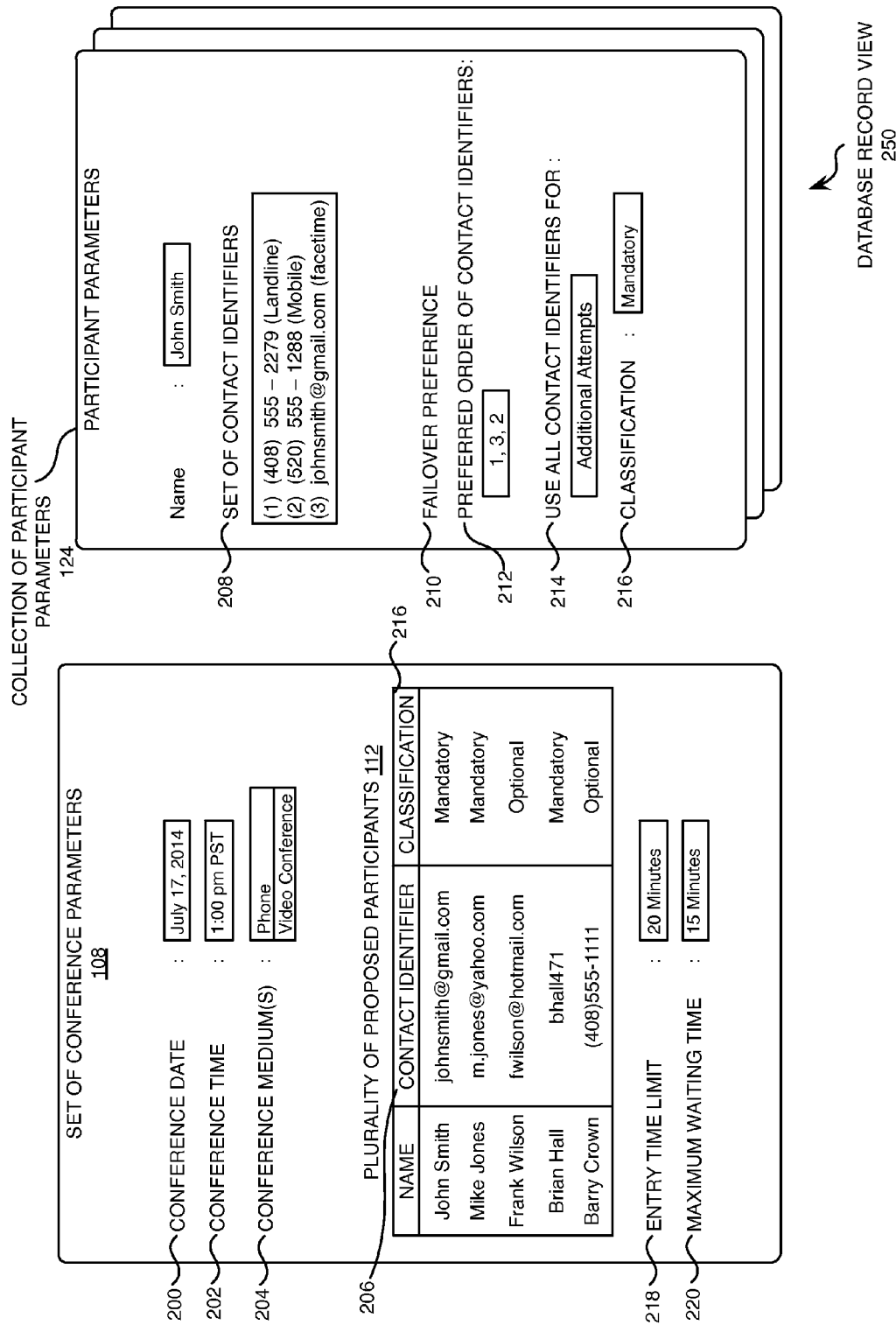
FIG. 2 is a database record view of a set of conference parameters and a collection of participant parameters of the database of FIG. 1, according to one embodiment.

In one embodiment a method of a conference facilitation server 100 determines, using a processor 104 and a memory 106, that a conference initiator 102 has defined a set of conference parameters 108 (e.g., as shown in FIG. 2) storing the set of conference parameters 108 (e.g., as shown in FIG. 2) in a database 110. The set of conference parameters 108 (e.g., as shown in FIG. 2) includes a conference date 200, a conference time 202, a conference medium 204, and a contact identifier 114 associated with each of a plurality of proposed participants 112. The method includes communicating a conference invitation 116 to the proposed participants (e.g., the plurality of proposed participants 112) using the contact identifier 114 associated with the plurality of proposed participants 112.

The method further includes designating the proposed participants (e.g., the plurality of proposed participants 112) as the confirmed participants 118 when the proposed participants (e.g., the plurality of proposed participants 112) send conference acknowledgements (e.g., the conference acknowledgement 120 of FIG. 1) to the conference facilitation server 100, responsive to the conference invitation 116 to each of the proposed participants (e.g., the plurality of proposed participants 112). The confirmed participants 118 are those proposed participants 112 that agree to join a collaborative session 122. The method processes a collection of participant parameters 124 (e.g., as illustrated in FIG. 2) of the confirmed participants 118, the collection of participant parameters 124 (e.g., as illustrated in FIG. 2) comprising, for each confirmed participant (e.g., such as one of the confirmed participants 118), a set of contact identifiers 114, and a failover preference 210.

FIG. 2 is a database record view 250 of a set of conference parameters 108 and a collection of participant parameters 124 of the database 110 of FIG. 1, according to one embodiment. Particularly, the exploded view of the set of conference parameters 108 illustrate a conference date field 200, a conference time field 202, a conference medium(s) field 204, a contact identifier field 206 and a classification field 216 (e.g., associated with the plurality of proposed participants 112 of FIG. 1), an entry time limit field 218, and a maximum waiting time field 220. In addition, the collection of participant parameters field 124 illustrate a set of contact identifiers field 208, a failover preference field 210, a preferred order of contact identifiers field 212, a 'use all contact identifiers for:' field, and a classification field 216.

The conference date field 200 may be a day of a month and/or year during which the collaborative session is held. The conference time field 202 may be a time of day at which the collaborative session is held. The conference medium(s) field 204 may be a way in which the collaborative session is broadcasted (e.g. via telephone, video, screencast, etc.) The conference medium(s) field 204 may also list the various forms, systems, and/or protocols of communication which a collaborative session may utilize. The contact identifier field 206 may be an alpha, numeric, and/or alphanumeric sequence unique and used towards distinguishing specific conference participants within various conference mediums. The classification field 216 (e.g., associated with the plurality of proposed participants 112 of FIG. 1) may be groupings of similar proposed participants designated as mandatory or optional. The entry time limit field 218 may be a length of time during which the participant may join the collaborative session. The maximum waiting time field 220 may be a length of time during which a collaborative session may wait for a mandatory participant before being cancelled.

The set of contact identifiers field 208 may be a set of alpha, numeric, and/or alphanumeric sequences unique towards distinguishing a specific confirmed participant. The failover preference field 210 may be a predetermined set of instructions indicating operations to be taken in the case of non-connection. The preferred order of contact identifiers field 212 may be a desired order of contact identifiers in which to attempt connection of the confirmed participant. The 'use all contact identifiers for:' field 214 may describe a circumstance when all contact identifiers may be used simultaneously. The classification field 216 may be groupings of similar participants as mandatory or optional.

The method automatically initiates a first attempt 126 to establish communications with the confirmed participants 118 at the conference time 202 on the conference date 200 through conference mediums 204 using the set of contact identifiers 114 associated with each of the confirmed participants 118. The method also ensures that the first attempt 126 is made in accordance with a failover preference 210 associated with each confirmed participant (e.g., of confirmed participants 118) and simultaneously makes the first attempt 126 to establish communications with a portion of the confirmed participants 118 in parallel. The method determines whether the first attempt 126 to establish communications with at least one confirmed participant (e.g., of confirmed participants 118) has failed and automatically initiates an additional attempt to establish communications with a particular confirmed participant with whom the first attempt 126 has failed, using the set of contact identifiers 114 associated with the particular confirmed participant, in accordance with a particular failover preference 210 associated with the particular confirmed participant.

The failover preference 210 associated with the particular confirmed participant specifies at least a preferred order (e.g., such as one of the failover-preferred order of contact identifiers 212 of FIG. 4) in which the set of at least one contact identifier 114 associated with the particular confirmed participant are to be used in making attempts to establish communications an order in which contact identifiers 114 are to be performed in making attempts to establish communications. The conference medium 204 may be a phone call, a video-conference session, a group chat, a telepresence session, a web conference, a screen share, and/or an online collaborative session 122. The failover preference 210 associated with each confirmed participant may further specify that a plurality of the contact identifiers 114 may be used simultaneously while making the first attempt 126, and/or the additional attempt 128.

The set of conference parameters 108 (e.g., as shown in FIG. 2) may further include a classification of each of the proposed participants (e.g., the plurality of proposed participants 112) as mandatory or optional. The conference initiator 102 may be an individual, a third-party service provider, a web application, an internet appliance and/or a mobile application. A collaborative session may be cancelled if a conference acknowledgement 120 has not been received by the conference time 202 on the conference date 200 from each of the proposed participants (e.g., the plurality of proposed participants 112) classified as mandatory.

The collaborative session 122 may be terminated if communications are yet to be established with all of the confirmed participants 118 classified as mandatory within a maximum waiting time. The communications with all of the confirmed participants 118 classified as mandatory may be established before attempting to establish communications with remaining confirmed participants 118. The set of conference parameters include an entry time limit 218 of FIG. 2, wherein attempts to establish communications with confirmed participants 118 cease once the entry time limit 218 of FIG. 2 has elapsed. The participants may be denied a permission to initiate communications with the conference.

In another embodiment, a method of a conference facilitation server 100 includes processing a set of conference parameters 108 (e.g., as shown in FIG. 2) in a database 110, the set comprising a conference date 200, a conference time 202, a conference medium 204, and a contact identifier 114 of each of a plurality of proposed participants 112 using a processor 104 and a memory 106. The method includes storing the set of conference parameters 108 (e.g., as shown in FIG. 2) in the database 110, the set comprising the conference date 200, the conference time 202, the conference medium 204, and/or the contact identifier 114 of each of a plurality of proposed participants 112. The method sends a conference invitation 116 to each of the proposed participants (e.g., the plurality of proposed participants 112) using contact identifiers 114.

The method further designates the proposed participants (e.g., the plurality of proposed participants 112) as a confirmed participants 118 based on a response of the proposed participants (e.g., the plurality of proposed participants 112). The confirmed participants 118 are those proposed participants that agree to join a collaborative session 122 in this embodiment. The method processes conference acknowledgements (e.g., the conference acknowledgement 120 of FIG. 1) from confirmed participants 118 and processes a collection of participant parameters (e.g., as illustrated in FIG. 2) for each of the confirmed participants 118, the collection of participant parameters (e.g., as illustrated in FIG. 2) comprising, for each confirmed participant, a set of at least one contact identifier 114, and a failover preference 210.

The method initiates a conference communication at a conference time 202 on a conference date 200 through a conference medium 204 by automatically making a first attempt 126 to establish communications with each of the confirmed participants 118 using the set of contact identifiers 114 associated with each of the confirmed participants 118, in accordance with the failover preference 210 associated with each confirmed participant. The method determines that an attempt to establish communications with at least one confirmed participant has failed and makes additional attempts to establish communications with a particular confirmed participant for whom a previous attempt has failed, using the set of contact identifiers 114 associated with the particular confirmed participant, in accordance with the failover preference 210 associated with the particular confirmed participant. The failover preference 210 associated with each confirmed participant further specifies a preferred order (e.g., such as one of the failover-preferred order of contact identifiers 212 of FIG. 4) in which the contact identifiers 114 are to be used in making attempts to establish communications.

In yet another embodiment, a conference facilitation system includes a conference facilitation server 100 including a processor 104 and a memory 106 configured to process a set of conference parameters 108 (e.g., as shown in FIG. 2), the set comprising a conference date 200, a conference time 202, at least one conference medium 204, and a contact identifier 114 for each of a plurality of proposed participants 112. The method prepares a conference invitation 116 for each of the proposed participants (e.g., the plurality of proposed participants 112) and processes a conference acknowledgement from one or more confirmed participants 118. The method processes a collection of participant parameters (e.g., as illustrated in FIG. 2) for each of the confirmed participants 118, the collection comprising a set of at least one contact identifier 114, and a failover preference 210, where the failover preference 210 associated with each confirmed participant specifies a preferred order (e.g., such as one of the failover-preferred order of contact identifiers 212 of FIG. 4) in which the set of at least one contact identifier 114 is to be used in making attempts to establish communications. The method initiates a collaborative session 122 at the conference time 202 on the conference date 200 by automatically triggering a first attempt 126 to establish communications with each of the confirmed participants 118 using the set of contact identifiers 114 associated with each of the confirmed participants 118, in accordance with the failover preference 210 associated with each confirmed participant, the first attempt 126 to establish communications with at least a portion of the confirmed participants 118 is triggered in parallel.

The method triggers an additional attempt to establish communications with a particular confirmed participant for whom a previous attempt has failed, using the set of contact identifiers 114 associated with the particular confirmed participant, in accordance with the failover preference 210 associated with the particular confirmed participant. The database 110 is communicatively coupled with the conference facilitation server 100 to store the set of conference parameters 108 (e.g., as shown in FIG. 2) and the collection of participant parameters 124 (e.g., as illustrated in FIG. 2) for each of the confirmed participants 118. A communication platform 140 communicatively coupled with the conference facilitation server 100 to instantiate a collaborative session 122 by attempting to establish communications with at least one confirmed participant 118 through the conference medium 204s, and to determine whether an attempt to establish communications has failed.

Figure 3:
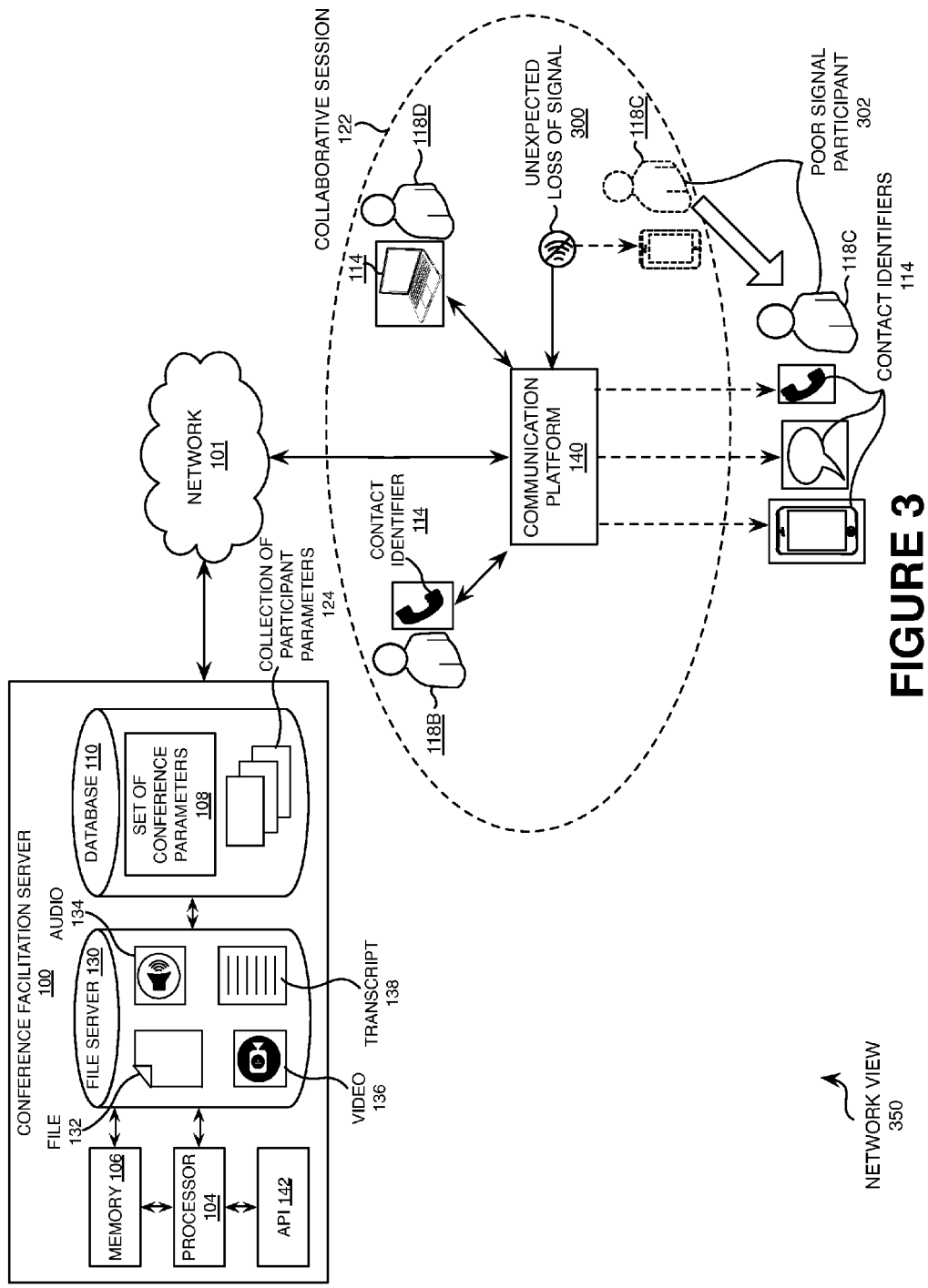
FIG. 3 is an Network view between the conference facilitation server and the communication platform of FIG. 1 in a scenario of an unexpected loss of signal and/or a poor signal participant, according to one embodiment.

FIG. 3 is an Network view 350 between the conference facilitation server 100 and the communication platform 140 of FIG. 1 in a scenario of an unexpected loss of signal 300 and/or a poor signal participant 302, according to one embodiment. Particularly, FIG. 3 focuses on the unexpected loss of signal scenario 300 and the poor signal participant scenario 302. The unexpected loss of signal 300 may be an abrupt removal of the conference participant from the communication platform of the conference. The poor signal participant 302 may be a conference participant with a substandard connection to the communication platform.

The method may determine there is an unexpected loss of communications with a poor-signal participant 302 and may automatically reestablish communications between the poor-signal participant 302 and a remaining confirmed participant based on the determination that there is the unexpected loss of communications with the poor-signal participant 302.

The communications between the poor-signal participant and the remaining confirmed participants 118 may automatically reestablished by repeatedly attempting to contact the poor-signal participant using the contact identifier 114s associated with the poor-signal participant. A repeated attempt to contact the poor-signal participant may be made in accordance with the failover preference 210s associated with the poor-signal participant.

FIG. 4 is a table view 450 of the collection of participant parameters 124 described in FIG. 2, along with a signal strength 402 and a status 404 of each confirmed participant name 400, according to one embodiment. The signal strength 402 may be an indicator as to the quality of the signal connection the conference participant to the communication platform (e.g. good, lost, a dB value, etc.) The status 404 may be an indicator as to the current connection condition (e.g. connected, reattempting connection, etc.). The confirmed participant name 400 may be a word and/or a set of words by which a participant is referred to.

Figure 5:
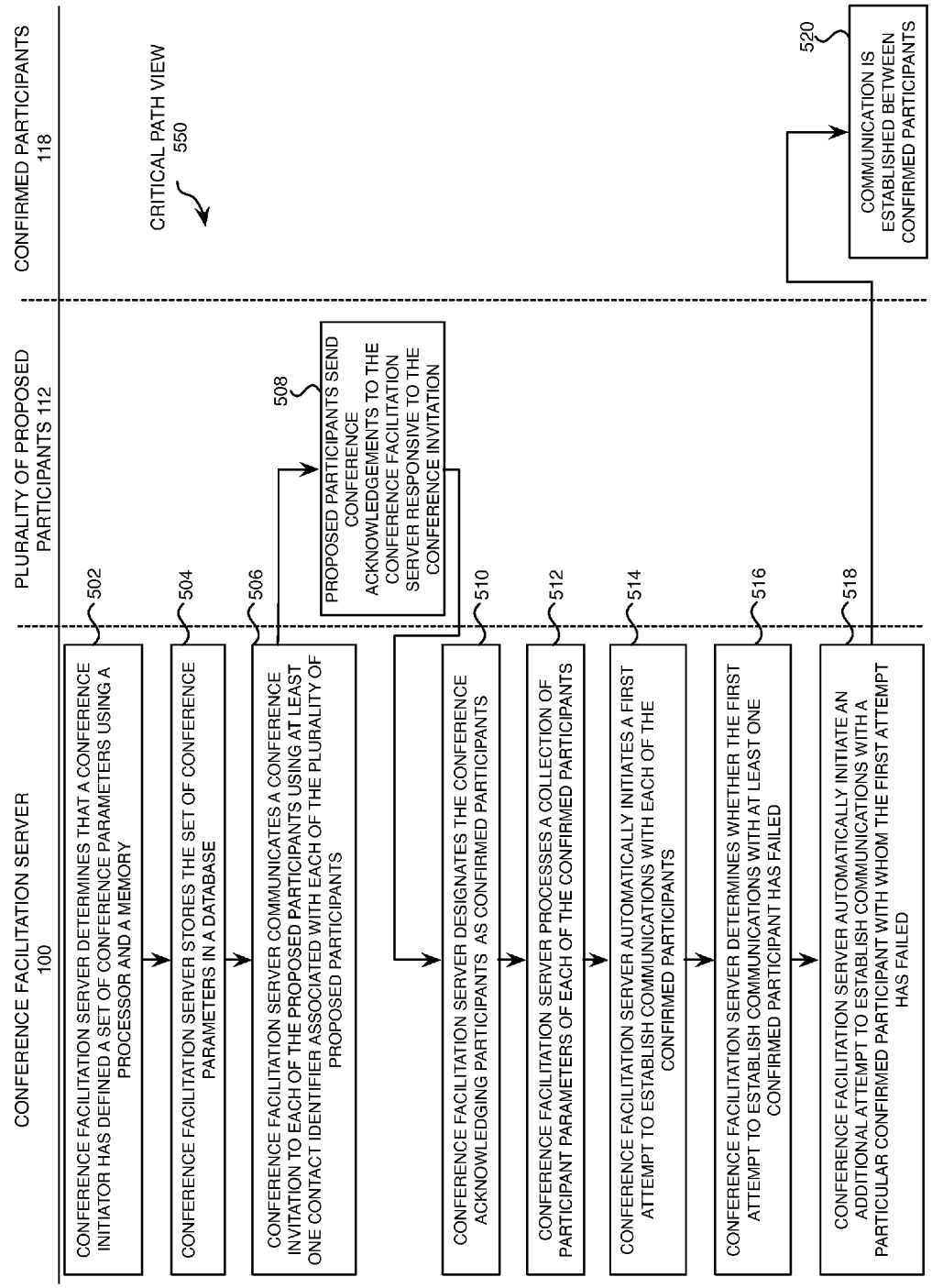
FIG. 5 is a critical path view of an interaction between the conference facilitation server of FIG. 1 with a plurality of proposed participants and confirmed participants, according to one embodiment.

FIG. 5 is a critical path view 550 of an interaction between the conference facilitation server 100 of FIG. 1 with a plurality of proposed participants 112 and confirmed participants 118, according to one embodiment. In operation 502, the conference facilitation server 100 may determine that a conference initiator 102 has defined a set of conference parameters 108 (e.g., as shown in FIG. 2) using a processor 104 and a memory 106. In operation 504, the conference facilitation server 100 may store the set of conference parameters 108 (e.g., as shown in FIG. 2) in a database 110. Then, in operation 506, the conference parameters may communicate a conference invitation 116 to each of the proposed participants (e.g., the plurality of proposed participants 112) using at least one contact identifier 114 associated with each of the plurality of proposed participants 112.

This information may then be communicated to the plurality of proposed participants 112 in operation 508. Particularly, in operation 508, the proposed participants (e.g., the plurality of proposed participants 112) may send conference acknowledgements (e.g., the conference acknowledgement 120 of FIG. 1) to the conference facilitation server 100 responsive to the conference invitation 116. Next, in operation 510, the conference facilitation server 100 may designate the conference acknowledging participants as confirmed participants 118.

In operation 512, the conference facilitation server 100 processes a collection of participant parameters (e.g., as illustrated in FIG. 2) associated with each of the confirmed participants 118. Then, in operation 514, the conference facilitation server 100 automatically initiates a first attempt 126 to establish communications with each of the confirmed participants 118. In operation 516, the conference facilitation server 100 determines whether the first attempt 126 to establish communications with at least one confirmed participant has failed. In operation 518, the conference facilitation server 100 automatically initiates an additional attempt to establish communications with a particular confirmed participant with whom the first attempt 126 has failed. Then, in operation 520, communication may be established between confirmed participants 118.

Figure 6A:
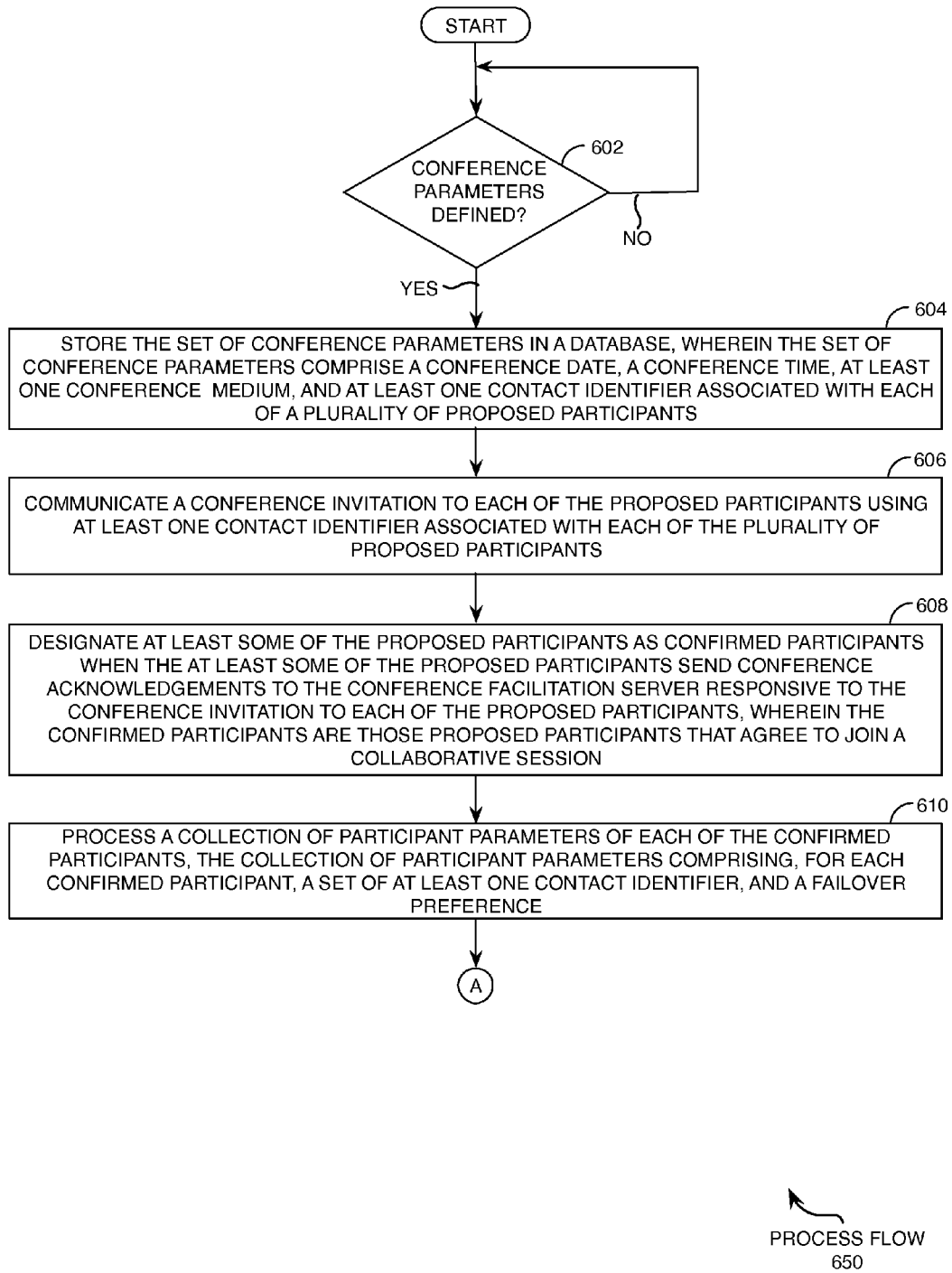
FIG. 6A and FIG. 6B is a process flow to ensure that a first attempt is made in accordance with a failover preference associated with each confirmed participant, according to one embodiment.
Figure 6B:
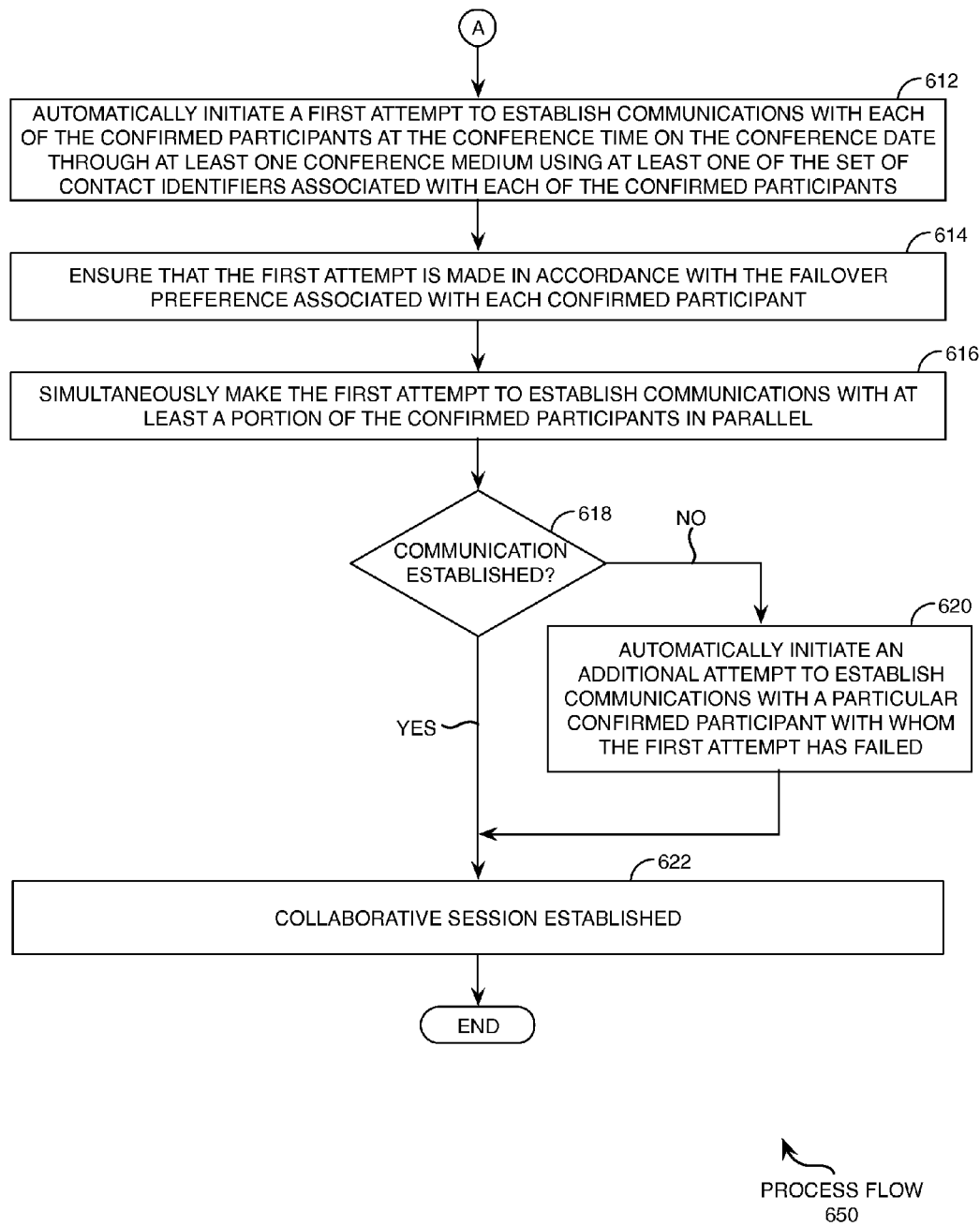

FIG. 6A and FIG. 6B is a process flow 650 to ensure that a first attempt 126 is made in accordance with a failover preference 210 associated with each confirmed participant, according to one embodiment. In operation 602, it may be determined whether conference parameters are defined. A loop pattern may be entered until they are defined. When they are defined, the set of conference parameters 108 (e.g., as shown in FIG. 2) may be stored in a database 110. The set of conference parameters 108 (e.g., as shown in FIG. 2) may include a conference date 200, a conference time 202, at least one conference medium 204, and/or at least one conference identifier associated with each of a plurality of proposed participants 112. Then, in operation 606, a conference invitation 116 may be communicated to each of the proposed participants (e.g., the plurality of proposed participants 112) using at least one contact identifier 114 associated with each of the plurality of proposed participants 112.

In operation 608, at least some of the proposed participants (e.g., the plurality of proposed participants 112) may be designated as confirmed participants 118 when at least some of the proposed participants (e.g., the plurality of proposed participants 112) send conference acknowledgements (e.g., the conference acknowledgement 120 of FIG. 1) to the conference facilitation server 100 responsive to the conference invitation 116 to each of the proposed participants (e.g., the plurality of proposed participants 112). The confirmed participants 118 may be those proposed participants that agree to join a collaborative session 122. In operation 610, a collection of participant parameters (e.g., as illustrated in FIG. 2) of each of the confirmed participants 118 may be processed. The collection of participant parameters (e.g., as illustrated in FIG. 2) (e.g., for each confirmed participant) may be a set of at least one contact identifier 114 and/or a failover preference 210 in operation 610. The process flow of FIG. 610 as illustrated in FIG. 6A may be then continued as indicated by 'circle A' into FIG. 6B. In FIG. 6B, a first attempt 126 may be automatically initiated to establish communications with each of the confirmed participants 118 at the conference time 202 on the conference date 200 through at least one conference medium 204 using at least one of the set of contact identifier 114s associated with each of the confirmed participants 118 in operation 612.

Then, in operation 614, it may be ensured (e.g., required, preferred) that the first attempt 126 may be made in accordance with the failover preference 210 associated with each confirmed participant. Next, in operation 616, a first attempt 126 to establish communications with at least a portion of the confirmed participants 118 in parallel may be simultaneously made. If the communication is established, as shown in 616, the collaborative session 122 may be established in operation 622 and the process may end. Alternatively, if the communication is not established in operation 618, then as additional attempt 128 to establish communications with a particular confirmed participant with whom the first attempt 126 has failed may be automatically initiated in operation 620.

Figure 7:
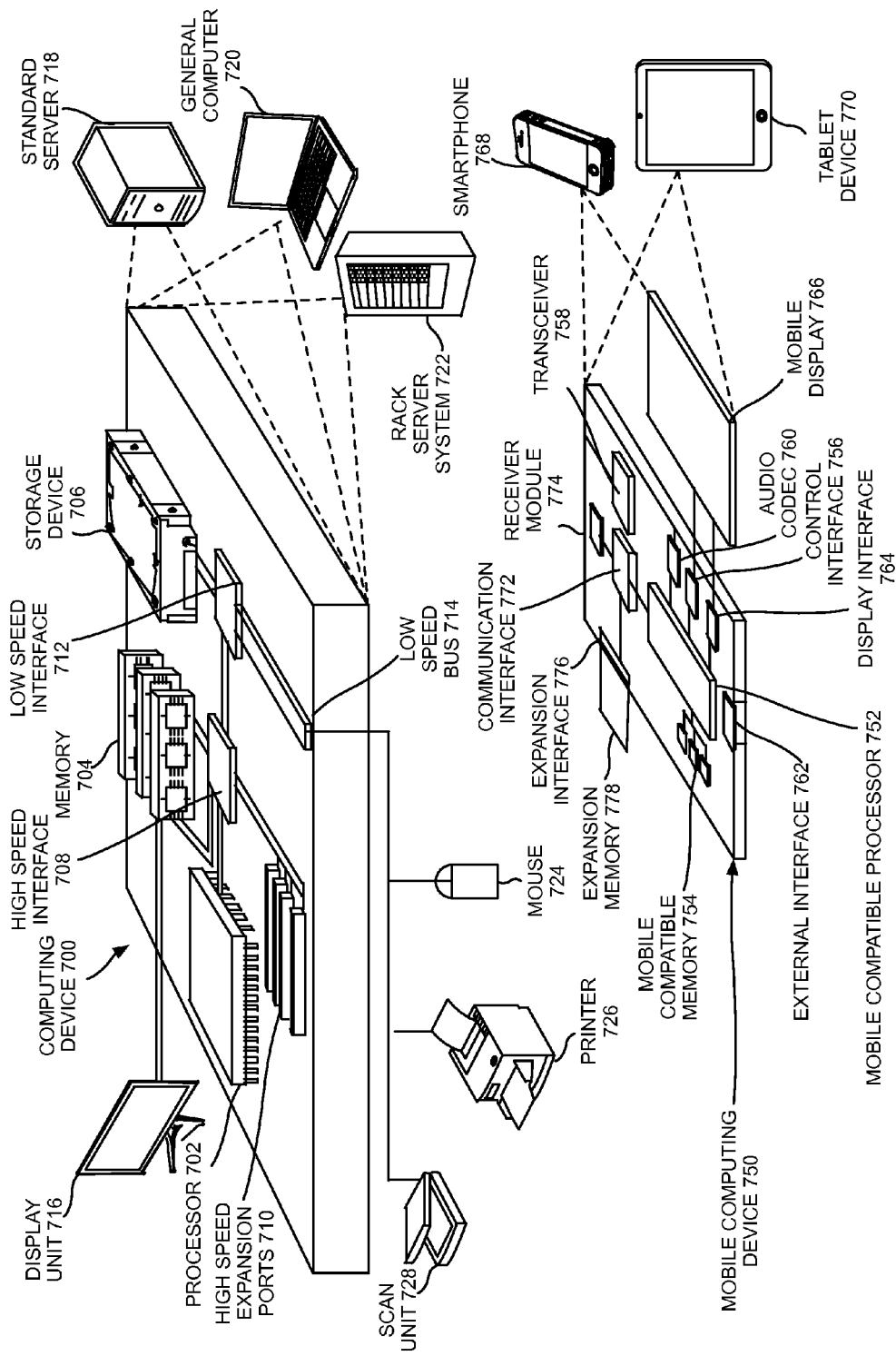
FIG. 7 is a schematic diagram of exemplary data processing devices that can be used to implement the methods and systems disclosed herein, according to one embodiment.

FIG. 7 is a schematic of a computing device 700 and a mobile device 750 that can be used to perform and/or implement any of the embodiments disclosed herein. In one or more embodiments, any of the one or more servers (e.g., one or more of the conference facilitation server 100, and/or the conference communication platform 140) may be the computing device 700. In addition, the communication device 103 may be either the computing device 700 or the mobile device 750.

The computing device 700 may represent various forms of digital computers, such as laptops, desktops, workstations, personal digital assistants, servers, blade servers, mainframes, and/or other appropriate computers. The mobile device 750 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

The computing device 700 may include a processor 702, a memory 704, a storage device 706, a high speed interface 708 coupled to the memory 704 and a plurality of high speed expansion ports 710, and a low speed interface 712 coupled to a low speed bus 714 and a storage device 706. In one embodiment, each of the components heretofore may be intercoupled using various buses, and may be mounted on a common motherboard and/or in other manners as appropriate. The processor 702 may process instructions for execution in the computing device 700, including instructions stored in the memory 704 and/or on the storage device 706 to display a graphical information for a GUI on an external input/output device, such as a display unit 716 coupled to the high speed interface 708. In other embodiments, multiple processors and/or multiple buses may be used, as appropriate, along with multiple memories and/or types of memory. Also, a plurality of computing devices 700 may be coupled with, with each device providing portions of the necessary operations (e.g., as a server bank, a group of blade servers, and/or a multi-processor system).

The memory 704 may be coupled to the computing device 700. In one embodiment, the memory 704 may be a volatile memory. In another embodiment, the memory 704 may be a non-volatile memory. The memory 704 may also be another form of computer-readable medium, such as a magnetic and/ or an optical disk. The storage device 706 may be capable of providing mass storage for the computing device 700. In one embodiment, the storage device 706 may be comprised of at least one of a floppy disk device, a hard disk device, an optical disk device, a tape device, a flash memory and/or other similar solid state memory device. In another embodiment, the storage device 706 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in at least one of the memory 704, the storage device 706, a memory coupled to the processor 702, and/or a propagated signal.

The high speed interface 708 may manage bandwidth-intensive operations for the computing device 700, while the low speed interface 712 may manage lower bandwidth-intensive operations. Such allocation of functions is exemplary only. In one embodiment, the high speed interface 708 may be coupled to at least one of the memory 704, the display unit 716 (e.g., through a graphics processor and/or an accelerator), and to the plurality of high speed expansion ports 710, which may accept various expansion cards. In the embodiment, the low speed interface 712 may be coupled to at least one of the storage device 706 and the low-speed bus 714. The low speed bus 714 may be comprised of a wired and/or wireless communication port (e.g., a Universal Serial Bus ("USB"), a Bluetooth® port, an Ethernet port, and/or a wireless Ethernet port). The low speed bus 714 may also be coupled to at least one of scan unit 728, a printer 726, a keyboard, a mouse 724, and a networking device (e.g., a switch and/or a router) through a network adapter.

The computing device 700 may be implemented in a number of different forms, as shown in the figure. In one embodiment, the computing device 700 may be implemented as a standard server 718 and/or a group of such servers. In another embodiment, the computing device 700 may be implemented as part of a rack server system 722. In yet another embodiment, the computing device 700 may be implemented as a general computer 720 such as a laptop or desktop computer. Alternatively, a component from the computing device 700 may be combined with another component in a mobile device 750. In one or more embodiments, an entire system may be made up of a plurality of computing devices 700 and/or a plurality of computing devices 700 coupled to a plurality of mobile devices 750.

In one embodiment, the mobile device 750 may comprise at least one of a mobile compatible processor 752, a mobile compatible memory 754, and an input/output device such as a mobile display 766, a communication interface 772, and a transceiver 758, among other components. The mobile device 750 may also be provided with a storage device, such as a microdrive or other device, to provide additional storage. In one embodiment, at least one of the components indicated heretofore are inter-coupled using various buses, and several of the components may be mounted on a common motherboard.

The mobile compatible processor 752 may execute instructions in the mobile device 750, including instructions stored in the mobile compatible memory 754. The mobile compatible processor 752 may be implemented as a chipset of chips that include separate and multiple analog and digital processors. The mobile compatible processor 752 may provide, for example, for coordination of the other components of the mobile device 750, such as control of user interfaces, applications run by the mobile device 750, and wireless communication by the mobile device 750.

The mobile compatible processor 752 may communicate with a user through the control interface 756 and the display interface 764 coupled to a mobile display 766. In one embodiment, the mobile display 766 may be at least one of a Thin-Film-Transistor Liquid Crystal Display ("TFT LCD"), an Organic Light Emitting Diode ("OLED") display, and another appropriate display technology. The display interface 764 may comprise appropriate circuitry for driving the mobile display 766 to present graphical and other information to a user. The control interface 756 may receive commands from a user and convert them for submission to the mobile compatible processor 752. In addition, an external interface 762 may be provide in communication with the mobile compatible processor 752, so as to enable near area communication of the mobile device 750 with other devices. External interface 762 may provide, for example, for wired communication in some embodiments, or for wireless communication in other embodiments, and multiple interfaces may also be used.

The mobile compatible memory 754 may be coupled to the mobile device 750. The mobile compatible memory 754 may be implemented as at least one of a volatile memory and a non-volatile memory. The expansion memory 778 may also be coupled to the mobile device 750 through the expansion interface 776, which may comprise, for example, a Single In Line Memory Module ("SIMM") card interface. The expansion memory 778 may provide extra storage space for the mobile device 750, or may also store an application or other information for the mobile device 750. Specifically, the expansion memory 778 may comprise instructions to carry out the processes described above. The expansion memory 778 may also comprise secure information. For example, the expansion memory 778 may be provided as a security module for the mobile device 750, and may be programmed with instructions that permit secure use of the mobile device 750. In addition, a secure application may be provided on the SIMM card, along with additional information, such as placing identifying information on the SIMM card in a non-hackable manner.

The mobile compatible memory 754 may comprise at least one of a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on at least one of the mobile compatible memory 754, the expansion memory 778, a memory coupled to the mobile compatible processor 752, and a propagated signal that may be received, for example, over the transceiver 758 and/or the external interface 762.

The mobile device 750 may communicate wirelessly through the communication interface 772, which may be comprised of a digital signal processing circuitry. The communication interface 772 may provide for communications using various modes and/or protocols, such as, at least one of: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol. Such communication may occur, for example, through the radio-frequency transceiver 758. In addition, short-range communication may occur, such as using a Bluetooth®, Wi-Fi, and/or other such transceiver. In addition, a GPS ("Global Positioning System") receiver module may provide additional navigation-related and location-related wireless data to the mobile device 750, which may be used as appropriate by a software application running on the mobile device 750.

The mobile device 750 may also communicate audibly using an audio codec 760, which may receive spoken information from a user and convert it to usable digital information. The audio codec 760 may likewise generate audible sound for a user, such as through a speaker (e.g., in a handset of the mobile device 750). Such a sound may comprise a sound from a voice telephone call, a recorded sound (e.g., a voice message, a music files, etc.) and may also include a sound generated by an application operating on the mobile device 750.

The mobile device 750 may be implemented in a number of different forms, as shown in the figure. In one embodiment, the mobile device 750 may be implemented as a smartphone 768. In another embodiment, the mobile device 750 may be implemented as a personal digital assistant ("PDA"). In yet another embodiment, the mobile device, 750 may be implemented as a tablet device 770.

A group of employees (e.g., participants) at the Acme Bread Company in Nashville Tenn. may decide that they need to discuss a crucial quarterly report earning. For this reason, they may hold a collaborative session (through a phone call, a videoconference session, a group chat, a telepresence session, a web conference, a screen share, and/or an online collaborative session). The Chief Financial Officer (CFO) Bob Jones may not need to publish a phone number and an access code associated with the collaborative session to the group of participants invited to the collaborative session thanks to the various embodiments described in FIGS. 1-7 leveraging the conference facilitation server 100 as described in FIG. 1. Security may be assured because of the various embodiments described in FIGS. 1-7, because the lack of phone number and the access code means the collaborative session may not be compromised by competitors accessing the collaborative session discussing key financial information that might affect stock price.

Also, more invited participants may join the conference on time because their phones and/or tablets may automatically ring instead of them having to pick up the phone, check their calendars, and find out which number and access code to dial, thanks to the various embodiments described herein. The collaborative session may proceed smoothly without disruption and without repetition requiring repeating of things already discussed by the CFO Bob Jones because everyone may join the collaborative session when called as opposed to having to manually call in themselves. Therefore, productivity may be enhanced at Acme Bread Company, and initiating and participating in the collaborative session may be a painless experience. Acme may make its numbers and have the needed privacy to succeed in the competitive wholesale bread business as a result.

It should be appreciated that the various embodiments described herein may be used for a dating service, a business conference, and/or a social conference call. Furthermore, the various embodiments described herein may be used by an automated 'internet-of-things' in which a collaborative session is parameterized by non-human, internet enabled devices. In other words, the conference initiator 102 of FIG. 1 may be an IP enabled appliance and/or device that automatically initiates and/or bridges calls between multiple human participants. As a specific example, an internet enabled car may define a set of conference parameters 108 which result in a conference invitation 116 being sent to the car owner and a service center, scheduling a time to discuss a recent change in car performance, or a bit of scheduled maintenance.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal display ("LCD") monitor) for displaying information to the user and a keyboard and a mouse 724 by which the user can provide input to the computer. Other kinds of devices can be used to provide for interaction with a user as well; for example, feedback provided to the user can be any form of sensory feedback (e.g., visual feedback, auditory feedback, and/or tactile feed-back) and input from the user can be received in any form, including acoustic, speech, and/or tactile input.

The systems and techniques described here may be implemented in a computing system that comprises at least one of a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may comprise at least one of a local area network ("LAN") and a wide area network ("WAN") (e.g., the Internet). The computing system can comprise at least one of a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method of a conference facilitation server:
determining, using a processor and a memory, that a conference initiator has defined a set of conference parameters;
storing the set of conference parameters in a database;
wherein the set of conference parameters comprise a conference date, a conference time, at least one conference medium, and at least one contact identifier associated with each of a plurality of proposed participants;
communicating a conference invitation to each of the proposed participants using the at least one contact identifier associated with each of the plurality of proposed participants;
designating at least some of the proposed participants as confirmed participants when the at least some of the proposed participants send conference acknowledgements to the conference facilitation server responsive to the conference invitation to each of the proposed participants,
wherein the confirmed participants are those proposed participants that agree to join a collaborative session;
processing a collection of participant parameters of each of the confirmed participants, the collection of participant parameters comprising, for each confirmed participant, a set of at least one contact identifier, and a failover preference;
automatically initiating a first attempt to establish communications with each of the confirmed participants at the conference time on the conference date through at least one conference medium using at least one of the set of contact identifiers associated with each of the confirmed participants;
ensuring that the first attempt is made in accordance with the failover preference associated with each confirmed participant;
simultaneously making the first attempt to establish communications with at least a portion of the confirmed participants in parallel;
determining whether the first attempt to establish communications with at least one confirmed participant has failed;
automatically initiating an additional attempt to establish communications with a particular confirmed participant with whom the first attempt has failed, using at least one of the set of contact identifiers associated with the particular confirmed participant, in accordance with a particular failover preference associated with the particular confirmed participant; and
wherein the failover preference associated with the particular confirmed participant specifies at least a preferred order in which the set of at least one contact identifier associated with the particular confirmed participant are to be used in making attempts to establish communications.

2. The method of claim 1,
wherein the at least one conference medium is a phone call, a videoconference session, a group chat, a telepresence session, a web conference, a screen share, and an online collaborative session.

3. The method of claim 1, wherein the failover preference associated with each confirmed participant further specifies that a plurality of contact identifiers may be used simultaneously while making at least one of: the first attempt, and the additional attempt.

4. The method of claim 3,
wherein the set of one or more conference parameters further comprises a classification of each of the proposed participants as at least one of mandatory and optional, and
wherein the conference initiator is at least one of an individual, a third-party service provider, a web application, an internet appliance and a mobile application.

5. The method of claim 4, wherein the collaborative session is cancelled if a conference acknowledgement has not been received by the conference time on the conference date from each of the proposed participants classified as mandatory.

6. The method of claim 5 wherein the collaborative session is terminated if communications are yet to be established with all of the confirmed participants classified as mandatory within a maximum waiting time.

7. The method of claim 6 wherein communications with all of the confirmed participants classified as mandatory are established before attempting to establish communications with the remaining confirmed participants.

8. The method of claim 7:
wherein the at least one conference parameter includes an entry time limit, and attempts to establish communications with confirmed participants cease once the entry time limit has elapsed.

9. The method of claim 8 wherein participants are denied a permission to initiate communications with the conference.

10. The method of claim 9, further comprising:
determining that there is an unexpected loss of communications with a poor-signal participant; and
automatically reestablishing communications between the poor-signal participant and remaining confirmed participants based on the determination that there is the unexpected loss of communications with the poor-signal participant.

11. The method of claim 10 wherein communications between the poor-signal participant and the remaining confirmed participants are automatically reestablished by repeatedly attempting to contact the poor-signal participant using the contact identifiers associated with the poor-signal participant.

12. The method of claim 11 wherein the repeated attempts to contact the poor-signal participant are made in accordance with the failover preference associated with the poor-signal participant.

13. A method of a conference facilitation server:
processing a set of conference parameters in a database, the set comprising a conference date, a conference time, at least one conference medium, and at least one contact identifier of each of a plurality of proposed participants, using a processor and a memory;

storing the set of conference parameters in the database, the set comprising the conference date, the conference time, at least one conference medium, and at least one contact identifier of each of the plurality of proposed participants;

sending a conference invitation to each of the proposed participants using the contact identifiers;

designating at least some of the proposed participants as confirmed participants based on a response of at least some of the proposed participants, wherein the confirmed participants are those proposed participants that agree to join a collaborative session;

processing conference acknowledgements from at least one confirmed participants;

processing a collection of participant parameters of each of the confirmed participants, the collection of participant parameters comprising, for each confirmed participant, a set of at least one contact identifier, and a failover preference;

initiating a collaborative session at the conference time on the conference date through at least one conference medium by automatically making a first attempt to establish communications with each of the confirmed participants using at least one of the set of contact identifiers associated with each of the confirmed participants, in accordance with the failover preference associated with each confirmed participant;

determining whether an attempt to establish communications with at least one confirmed participant has failed; and making additional attempts to establish communications with a particular confirmed participant for whom a previous attempt has failed, using at least one of the set of contact identifiers associated with the particular confirmed participant, in accordance with the failover preference associated with the particular confirmed participant;

wherein the failover preference associated with each confirmed participant further specifies a preferred order in which the contact identifiers are to be used in making attempts to establish communications.

14. The method of claim 13, wherein the first attempt to establish communications with at least a portion of the confirmed participants is made in parallel, and
wherein the conference initiator is at least one of an individual, a third-party service provider, a web application, an internet appliance and a mobile application.

15. The method of claim 14:
wherein the set of one or more conference parameters further comprises a classification of each of the proposed participants as at least one of: mandatory, and optional; and
wherein the collaborative session is cancelled if a conference acknowledgement has not been received by the conference time on the conference date from each of the proposed participants classified as mandatory.

16. The method of claim 15 wherein the collaborative session is terminated if communications have not been established with all of the confirmed participants classified as mandatory within a maximum waiting time.

17. A conference facilitation system comprising:
a conference facilitation server including a processor and a memory configured to:
process a set of conference parameters, the set comprising a conference date, a conference time, at least one conference medium, and at least one contact identifier for each of a plurality of proposed participants;
prepare a conference invitation for each of the proposed participants;
process conference acknowledgement from one or more confirmed participants;
process a collection of participant parameters for each of the confirmed participants, the collection of participant parameters comprising a set of at least one contact identifier, and a failover preference, wherein the failover preference associated with each confirmed participant specifies a preferred order in which the set of at least one contact identifier is to be used in making attempts to establish communications;
initiate a collaborative session at the conference time on the conference date by automatically triggering a first attempt to establish communications with each of the confirmed participants using at least one of the set of contact identifiers associated with each of the confirmed participants, in accordance with the failover preferences associated with each confirmed participant, wherein the first attempt to establish communications with at least a portion of the confirmed participants is triggered in parallel;
trigger an additional attempt to establish communications with a particular confirmed participant for whom a previous attempt has failed, using at least one of the set of contact identifiers associated with the particular confirmed participant, in accordance with the failover preference associated with the particular confirmed participant;
a database communicatively coupled with the conference facilitation server to store the set of conference parameters and the collection of participant parameters for each of the confirmed participants; and
a communication platform communicatively coupled with the conference facilitation server to instantiate a collaborative session by attempting to establish communications with at least one confirmed participant through at least one of the conference mediums, and to determine whether an attempt to establish communications has failed.

18. The conference facilitation server of claim 17, further comprising a fileserver, to store at least one of a file associated with a collaborative session, an audio recording of a collaborative session, a video recording of a collaborative session, and a transcript of a collaborative session.

19. The conference facilitation server of claim 18, wherein the conference facilitation server is configured to provide services through an API such that a third party service is able to define the set of conference parameters.

20. The conference facilitation server of claim 17:
monitoring for an unexpected loss of communications with a poor-signal participant wherein, upon detecting the unexpected loss of communications, communications between the poor-signal participant and the remaining confirmed participants are automatically reestablished,
wherein communications between the poor-signal participant and the remaining confirmed participants are automatically reestablished by repeatedly attempting to contact the poor-signal participant using the contact identifiers associated with the poor-signal participant,
wherein the repeated attempts to contact the poor-signal participant are made in accordance with the failover preference associated with the poor-signal participant,
wherein the failover preference associated with each confirmed participant further specifies that a plurality of contact identifiers may be used simultaneously while making at least one of: the first attempt, and additional attempts, wherein the set of one or more conference parameters further comprises a classification of each of the proposed participants as at least one of: mandatory, and optional, wherein the collaborative session is not initiated if a conference acknowledgement has not been received by the conference time on the conference date from each of the proposed participants classified as mandatory, wherein the collaborative session is terminated if communications have not been established with all of the confirmed participants classified as mandatory within a maximum waiting time, wherein communications with all of the confirmed participants classified as mandatory are established before attempting to establish communications with the remaining confirmed participants, wherein the set of one or more conference parameters includes an entry time limit; and attempts to establish communications with confirmed participants cease once the entry time limit has elapsed, and wherein participants are denied a permission to initiate communications with the collaborative session.

* * * * *